United States Patent [19]
Kirker et al.

[11] Patent Number: 5,658,477
[45] Date of Patent: Aug. 19, 1997

[54] METHOD AND APPARATUS FOR WELDING A STACK OF STATOR LAMINATIONS

[75] Inventors: Eric John Kirker, Vandalia; William Robert Patterson, Miamisburg, both of Ohio

[73] Assignee: Odawara Automation, Inc., Tipp City, Ohio

[21] Appl. No.: 567,175

[22] Filed: Nov. 22, 1995

[51] Int. Cl.⁶ ............................................ B23K 9/12
[52] U.S. Cl. .................... 219/125.1; 29/732; 219/137 R
[58] Field of Search ..................... 219/137 R, 125.1, 219/125.11; 29/609, 732

[56] References Cited

U.S. PATENT DOCUMENTS

| | | | |
|---|---|---|---|
| 2,788,436 | 4/1957 | Young et al. | 219/137 R |
| 2,980,267 | 4/1961 | Kalish | 29/732 |
| 3,283,399 | 11/1966 | Hart et al. | 29/609 |
| 3,822,830 | 7/1974 | Peters . | |
| 4,356,373 | 10/1982 | Mattson et al. . | |
| 4,383,356 | 5/1983 | Fichtner | 219/137 R |
| 4,393,298 | 7/1983 | Frantzreb, Sr. . | |
| 4,492,301 | 1/1985 | Inaba et al. . | |
| 4,523,076 | 6/1985 | Laymon | 219/125.1 |
| 4,580,334 | 4/1986 | McCracken et al. . | |
| 4,695,924 | 9/1987 | Santandrea et al. . | |
| 4,698,475 | 10/1987 | Lothenbach et al. . | |
| 4,713,883 | 12/1987 | Santandrea et al. . | |
| 4,768,727 | 9/1988 | Santandrea et al. . | |
| 4,788,407 | 11/1988 | Flater . | |
| 4,833,769 | 5/1989 | Tomite et al. . | |
| 4,956,910 | 9/1990 | Banner et al. . | |
| 5,240,235 | 8/1993 | Santandrea et al. . | |
| 5,373,623 | 12/1994 | Santandrea et al. . | |

*Primary Examiner*—Clifford C. Shaw
*Attorney, Agent, or Firm*—Thompson Hine & Flory LLP

[57] ABSTRACT

Welding a stack of stator laminations is accomplished with an arbor and a nest tool. The nest tool has a base from which extend plural lamination stacking members. The arbor is reciprocated with respect to the nest tool to extend through the center of a stack of laminations. A welding torch reciprocates relative to a stack of laminations to perform the welding operation.

20 Claims, 6 Drawing Sheets

METHOD AND APPARATUS FOR WELDING A STACK OF STATOR LAMINATIONS

BACKGROUND OF THE INVENTION

This invention relates to an apparatus and method for welding a stack of laminations to form a stator. The invention also relates to a nest tool used to hold a stack of stator laminations in position for processing and welding.

A stator of an electric motor is typically formed by welding a series of metal plates, known as laminations, together to form the stator. To facilitate the welding process, the laminations are usually carried in a stacked arrangement on a carrier and welded together to form the stator while remaining on the carrier. In the prior art, the laminations are stacked on a carrier having pins which pass through holes in the laminations to align the laminations for welding. These pins are usually no larger than one-eighth of an inch in diameter and, because of their small diameter, are easily bent during the welding process.

Stator laminations, when machined, have burrs, can be oily and stick together. Typically, the laminations are stamped from sheet metal. Often, the thickness of laminations will vary depending upon the portion of the sheet metal from which they are stamped. Usually, laminations cut from the same area of the sheet metal will vary in thickness from the side of the lamination that is stamped from the portion of sheet metal near the center of the sheet to the side of the lamination stamped from the portion of the sheet metal near the edge of the sheet. Manufacturing specifications for laminations typically allow a variation in thickness for each lamination of ±0.003 inch. As the number of laminations in a stack of laminations increases, the variation in thickness of the single laminations can cause the stack of laminations to lean to one side. Further, because of this thickness variation, providing a stack of laminations by a count of the number of laminations may result in stators having non-uniform size.

To manufacture the stator, a stack of laminations is welded along its sides. To ensure that the stack of laminations is properly welded, the stack must be tightly clamped so that no gaps exist between the laminations. As one can imagine, a weld can not be properly formed on the stack of laminations if spaces exist between the laminations. Previously in the art, a stack of laminations would be moved into position in a welding apparatus and, in the welding apparatus, the stack of laminations would first be clamped to prevent gaps from forming between the individual laminations. Once the laminations had been clamped, the clamped stack of laminations would be moved upwardly in the welding apparatus past stationary welding torches to weld the laminations. The clamping mechanism included an arbor which performed the functions of clamping the stack and aligning the laminations. The stack of laminations had to be maintained in a constant, clamped condition to ensure proper welding.

The prior art method of moving a stack of clamped laminations past stationary welding torches caused stress on the welding apparatus which resulted in excessive wear of the parts of the apparatus. The force required to maintain the stack of laminations in a clamped condition as the stack was moved past the welding torches damaged the arbor and clamping mechanism. Further damage to the apparatus resulted when welding stacks having a nonuniform size, the welding torches often welded portions of the welding apparatus other than the stack of laminations by starting at a position higher than the stack and/or ending at a position lower than the stack.

SUMMARY OF THE INVENTION

The welding apparatus of this invention comprises a frame having a first end and a second end. A water jacket assembly is mounted near the first end of the frame on a plate which extends between the sidewalls of the frame. An arbor is mounted at the first end of the frame and extends through corresponding apertures in the plate and the water jacket assembly. The arbor is reciprocated by means of a first cylinder which is mounted on the first end of the apparatus. A clamp is mounted at the second end of the frame. The clamp is reciprocated by means of a second cylinder. At least one welding torch is mounted for vertical reciprocation on the frame. Typically, two or more torches are mounted for reciprocation on the frame. A third cylinder is also mounted at the first end of the frame for moving the welding torches.

During a welding operation, a stack of laminations is moved into the welding apparatus. The arbor is then moved by the first cylinder to contact the stack of laminations by being inserted through the center of the stack. Once the arbor has been moved the full downward stroke of the first cylinder, the second cylinder moves the clamp, which has engaged the stack of laminations, toward the first end of the machine until the topmost lamination in the stack contacts the water jacket assembly. The upward force on the stack of laminations against the water jacket assembly maintains the stack of laminations in a clamped condition.

Once the stack of laminations is clamped between the clamp and the water jacket assembly, the welding operation begins. The welding is performed by the torches which move vertically along the frame of the apparatus. Before the welding operation begins, the torches are aligned with the bottom of the water jacket assembly and consequently aligned with the top most lamination in the stack. The weld is made from the top of the stack of laminations to the bottom of the stack while the stack remains clamped between the water jacket assembly and the clamp. Once the welding operation is completed, the arbor is removed from the stack and the stack of laminations is moved out of the welding apparatus. Because the stack of laminations is consistently moved to the same position in the welding apparatus before the welding operation begins, the welding torches can be positioned at the same place in relation to the stack of laminations before each welding operation begins. This results in fewer instances in which the welding torches weld portions of the apparatus other than the stack of laminations.

The length of the weld applied to the stack of laminations is controlled by monitoring the distance that the first cylinder moves the arbor. The first cylinder, which moves the arbor, and the third cylinder, which moves the torches, each have a stop mounted on their respective cylinder shafts. Once the first cylinder has extended the arbor and the arbor has been forced back up onto the water jacket assembly as the nest tool is moved upwardly, the stop on the first cylinder will have moved a total distance equivalent the height of the stack of laminations. By overlapping the stops on the cylinders such that, as it moves downwardly, the stop on the third cylinder contacts the stop on the first cylinder, the third cylinder is prevented from moving the welding torches any further than a distance equivalent to the length of the stack of laminations. When the stop on the third cylinder contacts the stop on the first cylinder, a switch on stop on the third cylinder shuts off the welding torches, thus, completing the welding operation.

The laminations are transported throughout the assembly apparatus on a nest tool. This nest tool comprises a base, two arms, a pin and a rod. The arms and the pin extend upwardly from the base. The laminations are carried on the base and maintained in a stacked orientation by the arms and the pin. The arms engage the periphery of a center aperture in the lamination and the pin engages an aperture in the periphery of the lamination. The rod extends downwardly from the base and terminates in a head. Slots are formed in the end of the rod near the head. The slots are engaged by the clamp to raise and lower nest tool while it is in the welding apparatus.

These features and other features and advantages of the present invention will be better understood by reference to the following detailed description, the accompanying drawings and the appended claims.

DETAILED DESCRIPTION

Figure 1:
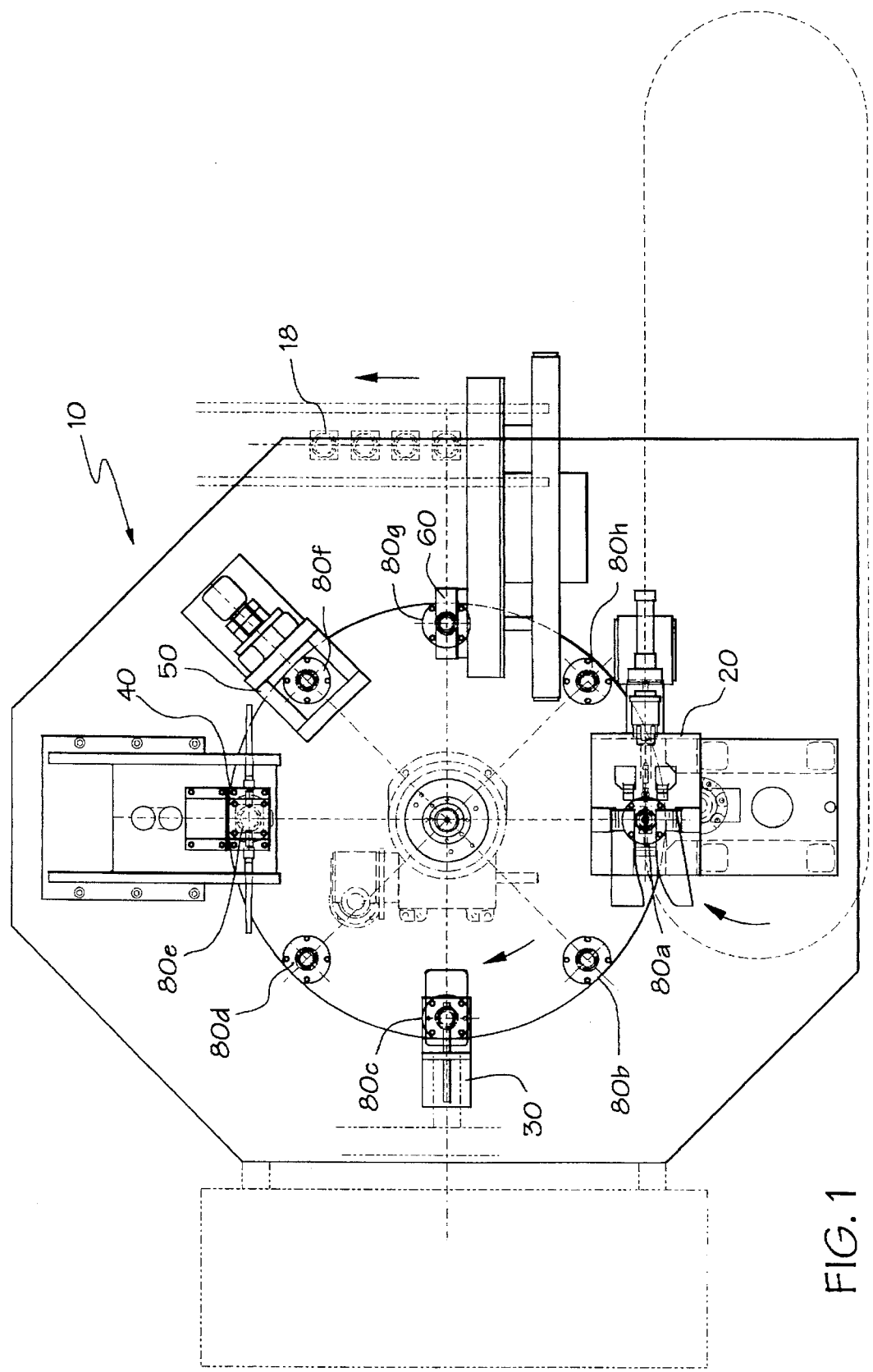
FIG. 1 presents a plan view of a stator lamination assembly apparatus.

FIG. 1 presents a plan view of a stator assembly apparatus 10. The apparatus stacks and welds stator laminations 12 to form stators 18. The apparatus 10 Comprises a loading station 20, a rotation station 30, a welding station 40, a measuring station 50 and an unloading station 60. The functions and operations of these stations are described in detail below. The stations, 20, 30, 40, 50 and 60, of the stator assembly apparatus 10 are mounted on a table 70 and are arranged to cooperate with a carousel 72 which transports the laminations 12 from one station to the next by rotating. Eight nest tools 80a, 80b, 80c, 80d, 80e, 80f, 80g and 80h are mounted for reciprocation on carousel 72. The nest tools 80 are mounted in apertures (not shown) in carousel 72 and located approximately 45 radial degrees apart from each other on the carousel 72.

To begin processing the laminations 12 to form a stator 18, the laminations 12 are loaded onto a nest tool 80 at the loading station 20. Typically, the laminations 12 are supplied to the loading station 20 in stacks known as stringers (not shown) which are approximately 3 feet long. The laminations 12 are fed by loading station 20 from the stringer onto the nest tool 80. The height of the stack of laminations 12 fed onto the nest tool 80 is determined by the difference in height between the portion of the loading station 20 which releases the laminations 12 onto the nest tool 80 and nest tool 80. After the laminations have been loaded onto the nest tool 80, the nest tool 80 is moved from station 20 to station 30 for further processing of the laminations 12.

At station 30, the uppermost half of the stack of laminations 12 is rotated 180°. This rotation is required to compensate for the difference in thickness of laminations 12 from one side to the other which may occur when the laminations are all stamped from the same portion of sheet metal having a constant variation in thickness. By rotating half of the stack of laminations 180°, any lean in the stack can be essentially eliminated. The resulting stack of laminations 12 will have an essentially straight orientation. After half of the stack has been rotated at station 30, carousel 72 moves nest tool 80 to welding station 40.

Carousel 72 rotates so that the nest tool 80 is moved into position in the welding station 40. At the welding station 40, the laminations 12 are welded together to form a stator 18. The operations of welding station 40 and the welding process are described in detail below. Once the laminations 12 have been welded to form the stator 18, the nest tool 80 carrying the stator 18 is moved out of the welding station 40 by carousel 72 and moved to the measuring station 50.

At station 50, the welded stator 18 is measured to determine whether the height of the stator 18 conforms to the height specifications required for the resulting stator. As previously stated, the individual laminations 12 can vary in height by about ±0.003 inch. Because of these variations in height, the stator 18 must be measured to determine whether the stator 18 conforms to the height specification required for the finished stator 18. To determine whether the stator 18 has the proper height, measuring station 50 uses a linear potentiometer (not shown) to measure the height of stator 18. If the height of stator 18 does not conform to the required height specifications, stator 18 is removed from the nest tool 80 and discarded. If the height of stator 18 complies with the predetermined specifications, carousel 72 moves stator 18 on the nest tool 80 to unloading station 60.

At unloading station 60, the stators 18 are removed from nest tool 80 for further processing or shipping. The completed stators 18 are removed from nest tool 80 at unloading station 60 by means of a gripper (not shown) which grips stator 18 and removes it from nest tool 80. After the stator 18 has been removed from the nest tool 80, carousel 72 moves nest tool 80 to loading station 20 to receive a new stack of laminations 12.

Figure 3:
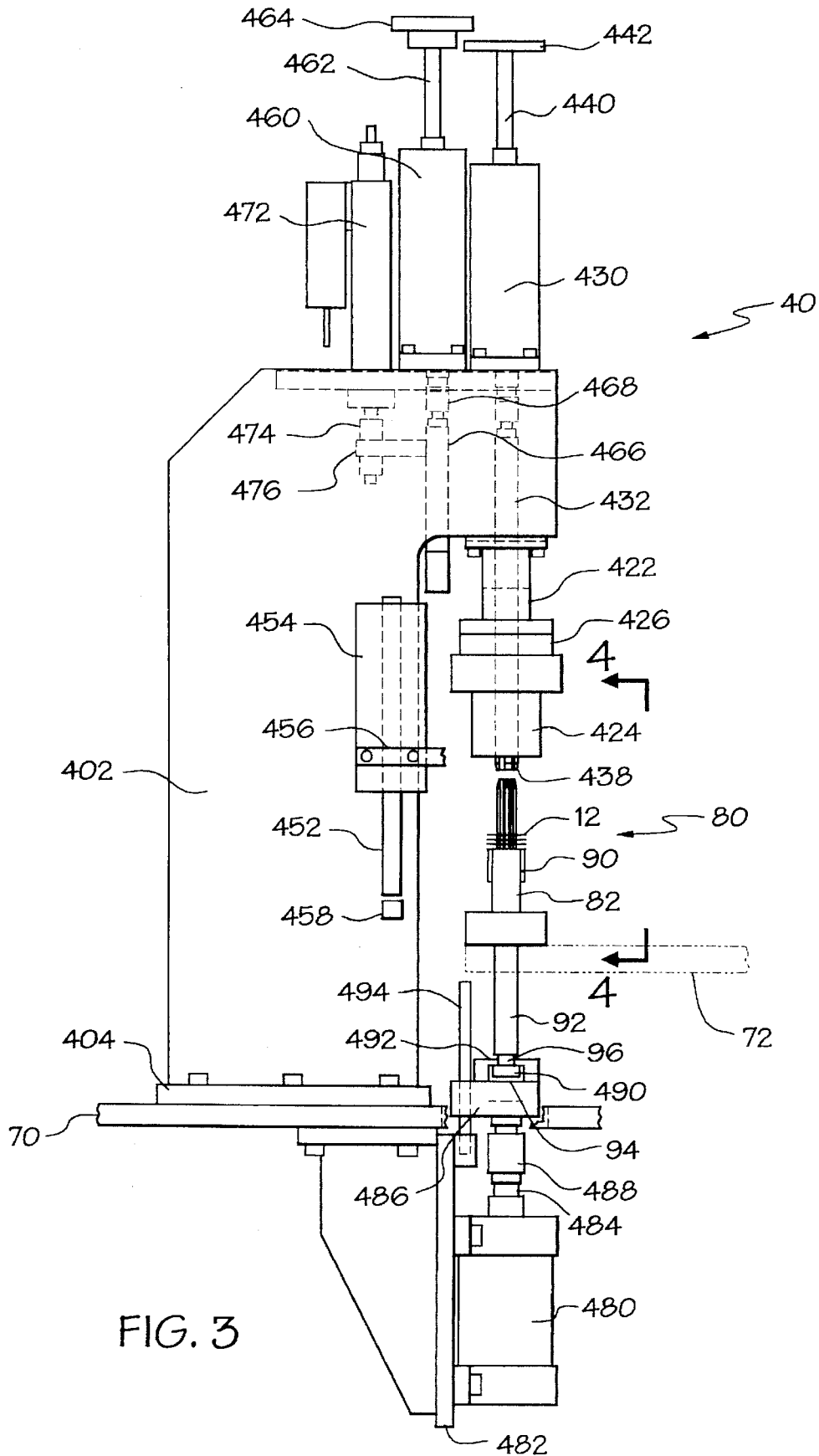
FIG. 3 presents a side view of the welding apparatus of the lamination assembly apparatus shown in FIG. 1.
Figure 6:
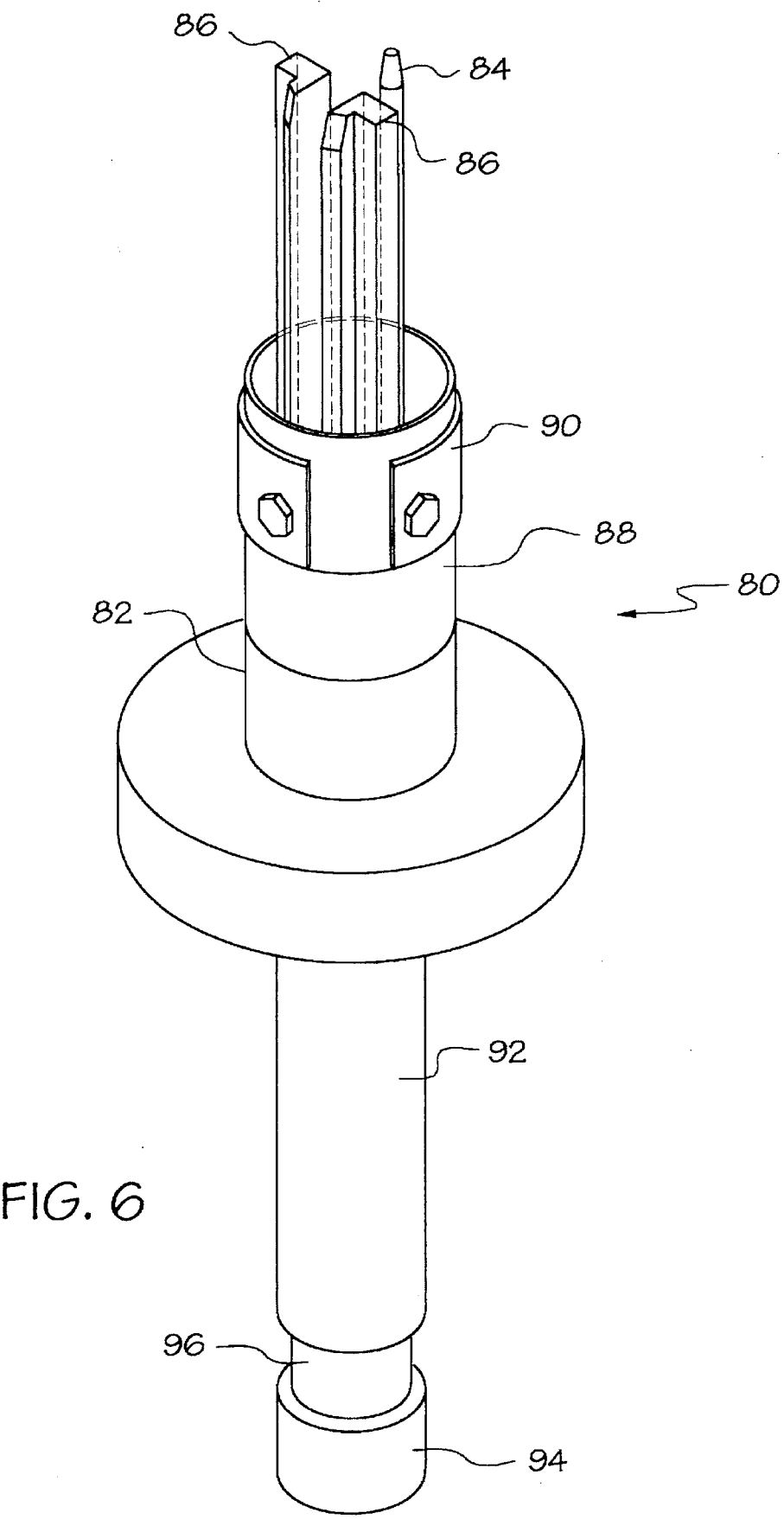
FIG. 6 presents a perspective view of the nest tool.

FIG. 6 presents a perspective of nest tool 80. As shown in FIG. 6, nest tool 80 comprises a base 82, a pin 84, a pair of arms 86, a spacer 88, a strike off plate 90 and a rod 92. Nest tool 80 is mounted for reciprocation in carousel 72. Pin 84 has a circular cross section and extends upwardly from base 82. Arms 86 have an L-shaped cross section and also extend upwardly from base 82 a distance equal to which pin 84 extends from base 82. When laminations are loaded on nest tool 80, the laminations are aligned on and maintained in a stacked condition on nest tool 80 by pin 84 and arms 86. Spacer 88, which is hollow, is mounted on base 82 by fasteners and encircles pin 84 and arms 86. Strike off plates 90 are removably mounted on the outside of spacer 88 by fasteners and are typically formed from copper. As shown in FIG. 3, rod 92 extends downwardly from base 82 and terminates in a head 94. At the end of rod 92 opposite base 82, slots 96 are formed in rod 92. Each of the stations, 20, 30, 40, 50 and 60, is designed to use rod 92 of nest tool 80 to manipulate nest tool 80 during the work operation being performed at that particular location.

Figure 2:
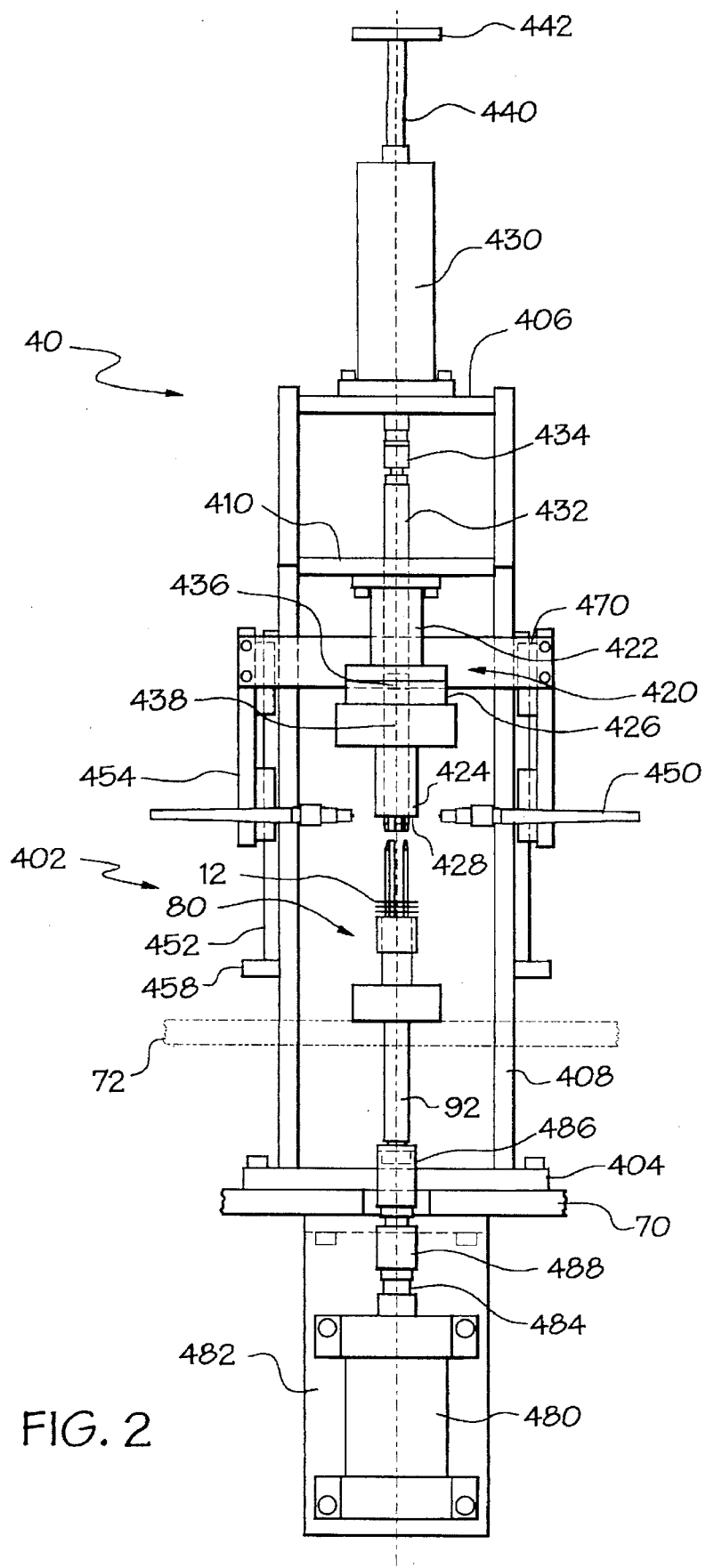
FIG. 2 presents a front view of the welding station of the lamination assembly apparatus shown in FIG. 1.

FIG. 2 presents a front view of the welding station 40. Welding station 40 generally comprises a frame 402, a water jacket assembly 420, welding torches 450, and a clamp 480. Frame 402 is mounted on base 404 which, in turn, is mounted on table 70. Frame 402 further comprises a top 406 and two sidewalls 408. Sidewalls 408 extend between base 404 and top 406. Plate 410 extends between the two sidewalls 408 of frame 402 and has an aperture (not shown) in its center.

As shown in FIG. 2, water jacket assembly 420 is mounted on and extends downwardly from plate 410. Water jacket assembly 420 comprises a water jacket support member 422, a water jacket 424 and a water jacket electrical isolator 426. Water jacket 424 is mounted on electrical isolator 426. Isolator 426 is mounted on water jacket assembly 420 between water jacket 424 and support member 422. Water jacket 424 is connected to a source of water which is not shown. Support member 422, water jacket 424 and water jacket isolator 426 are each cylindrically shaped and each has a central cavity through which arbor 438 reciprocates. Strike off plate 428 is removably mounted by fasteners on one end of water jacket 424 and has a center aperture which corresponds positionally to the central cavity in water jacket assembly 420. Typically, strike off plate 428 is formed from copper.

With continuing reference to FIG. 2, arbor cylinder 430 is mounted on top 406 of frame 402. Cylinder 430 is a hydraulic cylinder and has a bore of about 6.5 cm and a stroke of about 10.2 cm. Shaft 432 extends downwardly from arbor cylinder 430 and is linked to arbor cylinder 430 by means of a coupling 434. Preferably, shaft 432 is a ball spline shaft which reciprocates in bearings in mounting 422. Arbor electrical isolator 436 is journalled to shaft 432. Arbor 438 extends downwardly through the center of water jacket assembly 420 and is journalled to isolator 436. Cylinder rod 440 extends from the top of cylinder 430. Stop 442, which has a plate-like shape, is threadedly mounted on the end of rod 440.

To weld the stack of laminations, welding station 40 includes at least one welding torch 450. Typically, two welding torches 450 are mounted on welding station Torches 450 are mounted for vertical reciprocation along side walls 408. As shown in FIG. 2, linear bearings 452 are mounted on sidewalls 408. Bearing blocks 454 slidably engage linear bearings 452 and are movable vertically along linear bearings 452. Bearing blocks 454 are linked by tie bar 470. Torch mounts 456 are mounted on bearing blocks 454. Torches 450, which are typically conventional arc welding torches and known in the art, are adjustably mounted on torch mounts 456. Stops 458 are mounted at the end of linear bearings 452 closest to base 404. One skilled in the art will appreciate that welding station 40 can be modified so that four or even six torches can be mounted on welding station 40.

Torches 450 are vertically reciprocated by a torch actuation cylinder 460, which is shown in FIG. 3. Torch actuation cylinder 460 is mounted on top 406 of frame 402. For example, torch actuation cylinder 460 may have a bore of about 6.5 cm and a stoke of about 10.2 cm. Cylinder rod 462 extends from torch actuation cylinder 460. Stop 464 has a plate-like shape and is threadedly mounted on rod 462 of torch actuation cylinder 460. A switch (not shown), which shuts off the welding torches 450 when it contacts stop 442, is mounted on stop 464. Shaft 466 is linked to cylinder 460 by coupling 468 and extends downwardly from cylinder 460. Shaft 466 is journalled, at its end away from cylinder 460, to tie bar 470. Hydrocheck 472, for monitoring the continuity of the weld, as discussed later, is also mounted on top 406 of frame 402. Arm 474 extends downwardly from hydrocheck 472 and is linked to arm 466 of torch actuation cylinder 460 by means of bridging element 476.

Clamp actuation cylinder 480 is mounted on bracket 482 which is, in turn, mounted under table 70. For example, clamp actuation cylinder 480 may have a bore of 10.2 cm and a stroke of 10.2 cm. Cylinder rod 484 extends from clamp actuation cylinder 480. Clamp 486 is journalled to rod 484 of clamp actuation cylinder 480 by means of coupling 488. Clamp 486 includes a key way 490 in its upper surface. Keys 492 extend horizontally from the sides of key way 490.

Guide rod 494 is also mounted on bracket 482 and extends upwardly through table 70. Clamp 480 slidably engages guide rod 494 by means of a bearing (not shown).

Figure 4:
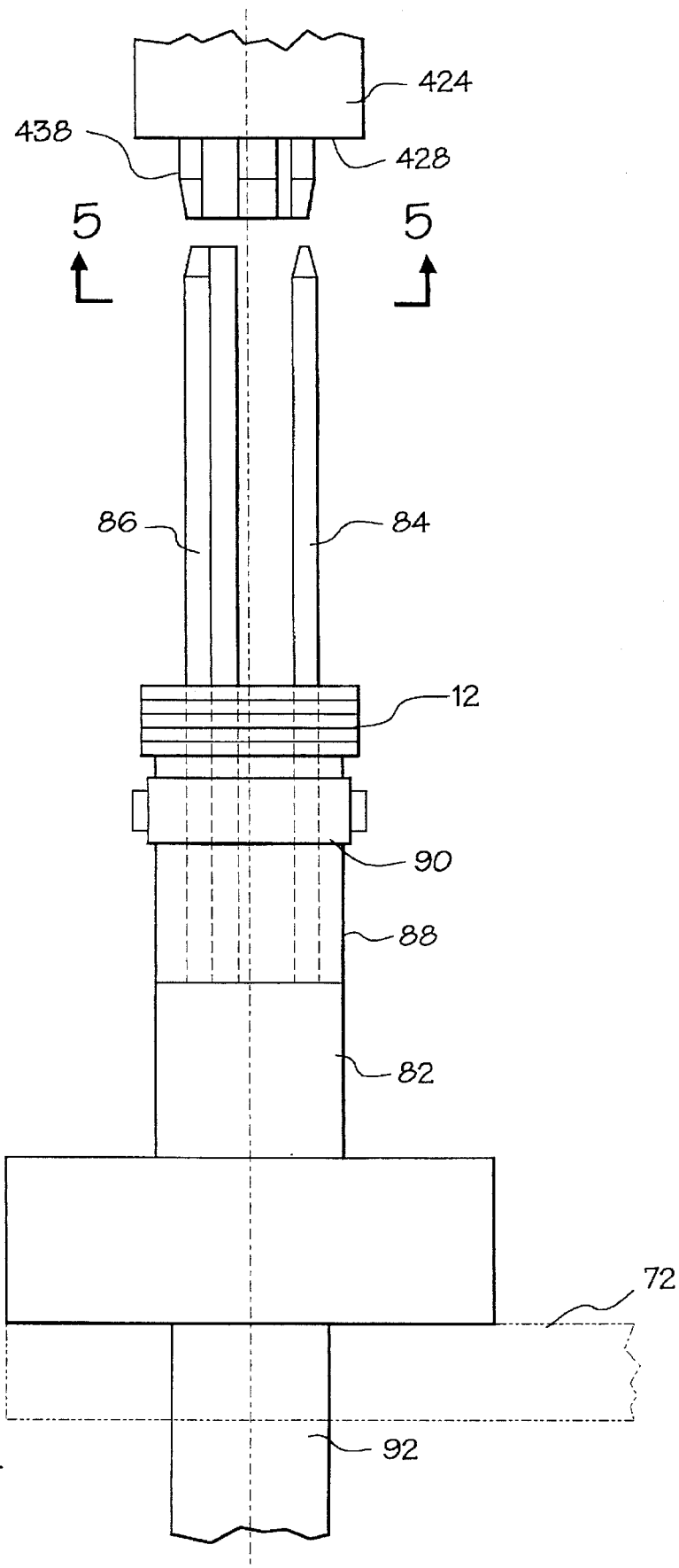
FIG. 4 presents an enlarged view of the nest tool shown along line 4—4 in FIG. 3.
Figure 5:
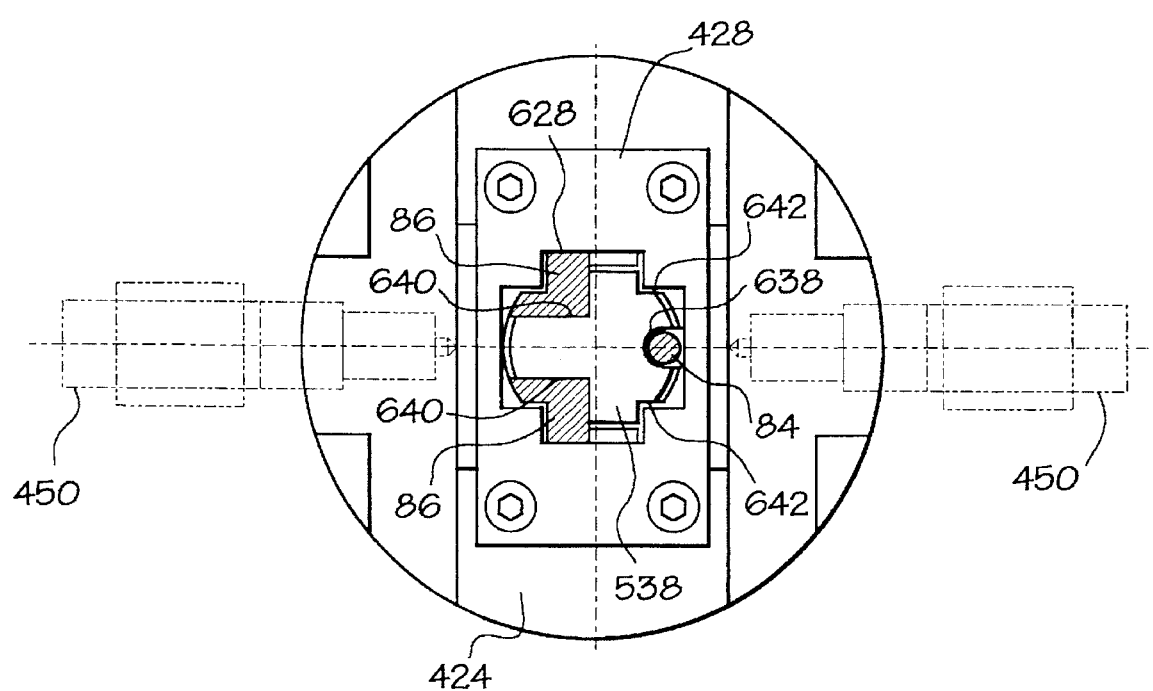
FIG. 5 presents a view of the water jacket assembly looking upwardly from the base of the welding apparatus as shown along line 5—5 in FIG. 4.

FIG. 5 presents a view of water jacket assembly 420 as viewed from base 404. As can be seen in FIG. 5, strike off plate 428 includes an aperture 628 which has a cruciform shape. Arbor 438 has an irregular cross section which could best be described as being generally T-shaped. A semicircular groove 638 is provided in the face of arbor 438. Opposite groove 638 in FIG. 4, two square cutouts form right angular grooves 640 in arbor 438. Two other cutouts 642, which are shaped similarly to cutouts 640, are located on arbor 438 adjacent to groove 638.

As can be seen in FIG. 4, the laminations 12 are retained in position on nest tool 80 by means of pin 84 and arms 86. Pin 84 engages an aperture (not shown) in the periphery of lamination 12. Arms 86 engage the center aperture of lamination 12. On nest tool 80, the lamination 12 is prevented from rotational movement about pin 84 by arms 86. In other words, the laminations 12 are maintained in a stacked condition by pin 84 and arms 86 align the laminations 12 for welding. The configuration of nest tool 80 provides greater stability than that of prior art lamination transport devices because the cross sectional area of arms 86 exceeds that of the pins employed in prior art devices. Because the pins on the prior art carriers were little more than one-eighth of an inch in diameter, they were easily bent while being moved about the assembly apparatus 10, in general, and welding station 40, in particular.

As stated above, the laminations 12 are loaded onto the nest tool 80 at the loading station 20. The laminations 12 are loaded so that pin 84 passes through an aperture in the periphery of lamination 12 and arms 86 engage the center aperture of lamination 12. After being loaded at station 20, the laminations 12 are transported to the rotation station 30 and then to the measuring station 40. If the stack of laminations 12 is found to conform to the height specifications for the resulting stator 18, the stack of laminations 12 is moved from welding station 40 into measuring station 50 to be welded.

Carousel 72 moves nest tool 80 into position for welding in welding station 40. As carousel 72 rotates nest tool 80 into position, head 94 of nest tool 80 is moved into key way 490 in clamp 486. As head 94 of nest tool 80 is being moved into position in clamp 486, slots 96 in rod 92 engage keys 492 of key way 490 in clamp 486. Nest tool 80 is positioned on carousel 72 so that, when carousel 72 moves nest tool 80 into position in welding station 40, slots 92 engage keys 488.

Once nest tool 80 has been moved into position for welding in welding station 40, arbor 438 is lowered by means of cylinder 436 to engage both nest tool 80 and the stack of laminations 12. As arbor 438 engages nest tool 80, groove 638 of arbor 438 engages pin 84 of nest tool 80 and cutouts 640 engage arms 86 of nest tool 80. Arbor 438 is moved downwardly into the stack of laminations 12 by cylinder 430 until cylinder 430 completes its downward stroke. The length of groove 638 and cutouts 640 are sufficient to allow arbor 438 to engage pin 84 and arms 86 of nest tool 80. When cylinder 430 reaches the end of its downward stroke, the downward motion of arbor 438 is stopped. At the end of the downward stroke of cylinder 430, arbor 438 usually does not contact base 82 of nest tool 80 and may not completely penetrate the stack of laminations 12.

After cylinder 430 has completed its downward stroke, nest tool 80 is moved upward toward water jacket assembly 420 by clamp actuation cylinder 480. Clamp actuation cylinder 480 drives rod 484 which moves clamp 486 upward by means of coupling 488. To prevent clamp 486 from rotational movement and to prevent slots 94 of nest tool 80 from disengaging from keys 492 as nest tool 80 is moved vertically by clamp actuation cylinder 480, clamp 486 slidably engages rod guide 494 by a bearing (not shown). As clamp 486 is moved upwardly, guide rod 494 prevents clamp from rotating about rod 484.

As clamp actuation cylinder 480 moves clamp 496 and nest tool 80 upwardly toward water jacket assembly 420, arbor 438 engages base 82 of nest tool 80. When arbor 438 engages base 82 of nest tool 80, arbor 438 is moved upwardly toward water jacket assembly 420. As arbor 438 moves upwardly into frame 420, it forces shaft 432 to move into cylinder 430 causing rod 440 of cylinder 430 to move upwardly. Nest tool 80 is moved upwardly toward water jacket assembly 420 until the stack of laminations 12 contacts strike off plate 428. Once the stack of laminations 12 contacts strike off plate 428, clamp actuation cylinder 480 ceases its upward stroke and remains in position beneath water jacket assembly 420. A clamping action is created on the stack of laminations 12 by the downward force applied to the stack by water jacket assembly 420 and by the upward force applied by nest tool 80 through clamp 486. This clamping action maintains the laminations in stacked condition so that no gaps exist between the laminations as they are being welded together. After the stack of laminations 12 has been clamped against plate 428 which is positioned beneath water jacket assembly 420, torches 450 are activated to begin the welding process.

Torches 450 are typically adjusted so that their tips are aligned with the bottom portion of strike off plate 428. Once the stack of laminations is in position beneath water jacket assembly 420, the torches are aligned with the uppermost lamination 12 in the stack of laminations 12. Cylinder 460 reciprocates torches 450 by moving shaft 468 downwardly toward base 404 by means of coupling 468. Shaft 468 moves tie bar 470 downwardly by means of shaft 466 which is journalled to tie bar 470. Because tie bar 470 is journalled to both bearing blocks 454, bearing blocks 454 are moved simultaneously. Bearing blocks 454 move along linear bearings 452 which are mounted on sides 408 of frame 402. As bearing blocks 454 move downwardly along linear bearings 452, torch mounts 456, on which torches 450 are mounted, are moved downwardly. As the torches 450 move downwardly, they weld the stack of stator laminations 12 to form a stator 18.

Torches 450 apply the weld to the stack of laminations 12 until stop 464 on rod 462 of torch actuation cylinder 460 contacts stop 442 on rod 440 of arbor cylinder 430. As stated above, stop 442 and stop 464 have overlapping diameters so that stop 464 can not move past stop 442 without contacting stop 442. Once stop 464 contacts stop 442, the downward stroke of torch actuation cylinder 460 is stopped. Once the downward stroke of torch actuation cylinder 460 is stopped, the downward motion of torches 450 is also stopped. When stop 464 contacts stop 442, the switch mounted on stop 464 shuts off the welding torches 450. At this time, the stack of laminations will have been welded from top to bottom with little, if any, overrun onto other parts of the welding station 40 or the nest tool 80. Typically, if there is an overrun, it will be no more than about 4 mm.

The distance between stop 442 and stop 464, before torch actuation cylinder 460 begins its downward stroke, equals the approximate height of the stack of laminations 12 on nest tool 80. This distance is derived from the movement of stop 442 on shaft 430. Before the welding process begins, arbor 438 is moved by cylinder 430 to engage the stack of laminations 12 and then contacts base 82 of nest tool 80 as nest tool 80 is moved upwardly by clamp actuation cylinder 480, as described above. Once clamp 486 has completed its upward movement, arbor 438 extends from water jacket assembly 420 a distance approximately equal to the height of the stack of laminations 12 plus the height to which spacer 88 extends above base 82. To compensate for the height of spacer 88, stop 442 is adjustably mounted on cylinder shaft 440. When adjusted to compensate for spacer 88, stop 442 moves a distance approximately equal to the height of the stack of laminations 12. Thus, stop 442 allows cylinder 460 to move torches 450 a distance equivalent to the height of the stack of laminations 12.

Because this process may result in a weld overrun onto spacer 88, strike off plates 90 are mounted on spacer 88 to prevent nest tool 80 from becoming damaged during the welding process. As a further safe guard against over welding or welding onto nest tool 80, stops 458 are provided on the side walls 408 of the apparatus. When bearing blocks 454 contact stops 458, the downward motion of torches 450 is stopped. However, the downward motion of torches 450 is usually stopped when stop 464 on cylinder shaft 462 engages stop 442 on cylinder shaft 440 due to the overlapping diameters of stop 442 and stop 464.

To ensure that the welds, which are applied to the stack of laminations 12, are even and continuous, the welding station 40 includes a hydrocheck 472. As stated above, arm 474 of hydrocheck 472 is journalled to shaft 466 of cylinder 460 by bridging element 476. Hydrocheck 472 monitors the fluid level in torch actuation cylinder 460 to ensure that the downward stroke of torch actuation cylinder 460 is smooth and continuous. Hydrochecks, such as those employed in this invention, are commonly known in the art and a typical hydrocheck is available from Allenair of Mineola, N.Y.

Once the welding operation has been completed, torches 450 are retracted by torch actuation cylinder 460. To retract torches 450, torch actuation cylinder 460 begins its upward stroke. As cylinder begins its upward stroke, shaft 466 is retracted by cylinder 460. As shaft 460 is retracted, tie bar 470 is drawn toward torch actuation cylinder 460 causing bearing blocks 454 to be move upwardly along linear bearings 452. As bearing blocks 454 are retracted, torches 450, which are mounted on torch mounts 456 on bearing blocks 454, are also retracted. The upward stroke of cylinder 460 also causes rod 462 and, subsequently, stop 464 to move away from cylinder 460.

Once torch actuation cylinder 460 has retracted torches 450, arbor 438 is retracted by cylinder 430. When arbor cylinder 430 begins its upward stroke, it retracts shaft 432 by means of coupling 434. Shaft 432 withdraws arbor 438 from the center of the stator 18 on nest tool 80 by means of its connection with arbor insulator 436. As arbor 438 is retracted by cylinder 430, the stator 18 is stripped from arbor 438 by contact with strike off plate 428. The upward stroke of cylinder 430 also causes rod 440 and, subsequently, stop 442 to move away from cylinder 430.

After arbor 438 has been retracted, nest tool 80 is lowered away from water jacket assembly 420 by clamp actuation cylinder 480. Clamp actuation cylinder 480 retracts shaft 484 which in turn retracts clamp 486 by means of coupling 488. As clamp 486 is lowered, it slides down rod 494 by means of the bearing (not shown). Again, guide rod 494 ensures that clamp 486 will not become disengaged from rod 92 of nest tool 80 as nest tool 80 is lowered toward carousel 72. Nest tool 80 is lowered until base 82 contacts carousel 72.

Once nest tool 80 has been lowered so that base 82 contacts carousel 72, carousel 72 rotates and moves the completed stator 18 toward measuring station 50. As carousel 72 rotates, head 94 of nest tool 80 is disengaged from key way 490 and slots 96 in head 90 are moved out of contact with keys 592 which allows nest tool 80 to be moved to measuring station 50.

As one skilled in the art will appreciate, the welding process generates a large quantity of heat. To prevent arbor 438 from becoming damaged by the excessive heat generated during the welding process, water jacket assembly 420 includes water jacket 424. Water jacket 424 constantly circulates a flow of water around arbor 438 which acts to cool arbor 438 as the stack of laminations 12 is being welded. Water jacket 424 also cools arbor 438 to inhibit arbor 438 from expanding as the welding is in progress. If arbor 438 were to expand, removal of arbor 438 from the stack of laminations 12 would be hindered. Conceivably, without water jacket 424 to cool arbor 438, arbor 438 could expand and engage the inside of the stack of laminations 12 damaging the inside of the stack 12 and arbor 438 as nest tool 80 is lowered away from water jacket assembly 420. The water for water jacket 424 can be provided from a dedicated reservoir or tank or from a tap. Preferably, the water supplied to water jacket 424 comes from a closed loop chiller.

Welding station 40 includes water jacket electrical isolator 426 and arbor electrical isolator 436. Water jacket electrical isolator 426 insulates water jacket 424 from water jacket assembly 420. Water jacket isolator 426 is journalled to water jacket support member 422 on one side and water jacket 424 on the other side and prevents the flow of electrical current between water jacket 424 and water jacket support member 422 and the remainder of welding station 40. Water jacket electrical isolator 426 is typically a block of an insulating material such as a high pressure laminate. These high pressure laminates are commercially available and are typically made of glass epoxy. Such high pressure laminates are sold under the trademark MICARTA® and are available from Westinghouse Electric Corp. Similar to water jacket electrical isolator 426, arbor electrical isolator 436, which is journalled to shaft 432 at one end and arbor 438 at the other end, insulates shaft 432 from arbor 438. Arbor electrical isolator 436 prevents the flow of electrical current generated during the welding process from being transferred up shaft 432 to cylinder 430 and to the remainder of welding station 40. Arbor electrical isolator 436 is also typically formed of an insulating material such as a high pressure laminate as is described above.

To prevent water jacket 424 from becoming directly damaged by welding torches 450, strike off plate 428 is mounted on the bottom of water jacket 424. Strike off plate 428 is provided so that, if torches 450 begin welding at a position above the stack of laminations 12, strike off plate 428 will be contacted by the arc of torches 450 instead of water jacket 424. Further, because strike off plate 90 is mounted on water jacket 424, the heat absorbed by strike off plate 428 during a welding operation is transferred to water jacket 424 and dissipated. Further, strike off plate 428 is removably mounted on water jacket 424 so that it can be easily replaced with a new strike plate when it becomes worn and no longer usable.

Strike off plate 90, which is mounted on spacer 88, prevents nest tool 80 from becoming damaged by welding torches 450 during the Welding process. If welding torches 450 travel past the bottom lamination 12 in the stack of laminations 12 during the welding process, the arc from the torches 450 contacts strike off plate 90 which absorbs the arc of welding torches 450 and prevents nest tool 80 from becoming damaged.

In an alternate embodiment of the invention, cylinder 430, cylinder 460 and cylinder 480 can be replaced with servo motors. The servo motors serve to reciprocate arbor 458, torches 450 and clamp 486 in place of cylinders 430, 460 and 480, respectively. Servo motors allow for the precision movement of the part, arbor 438, torches 450 and clamp 486, to which they are connected so that the part can be moved an indicated distance and in a precise manner without having to employ overlapping stops, such as stops 442 and 464, or hydrocheck 472.

Although welding station 40 has been described herein as typically having two welding torches 450, one skilled in the art will appreciate that with slight modification, welding station 40 could include four welding torches positioned so that a weld could be applied to each side of square stator or could include six torches to facilitate the welding of larger stators.

Although cylinder 430, cylinder 460 and cylinder 480 have been described herein as having particular bores and strokes, one skilled in the art will appreciate that cylinders of differing sizes can be employed with this invention without affecting the operations of the welding apparatus.

Having described the invention in detail, it will be apparent that numerous variations and modifications are possible without departing from the spirit and scope of the invention as defined by the following claims.

What is claimed is:

1. A welding apparatus for welding a stack of stator laminations comprising:

an arbor;

a nest tool including a base and a plurality of lamination stacking members extending therefrom, the arbor and the nest tool reciprocating with respect to each other such that a plurality of laminations can be stacked on the stacking members on the nest tool and the stack of laminations can be clamped between the arbor and the nest tool with the arbor extending downwardly through the center of the stack of laminations wherein said arbor is reciprocated by a first cylinder and wherein a first stop is mounted on said first cylinder; and at least one welding torch mounted for reciprocation relative to the stack of laminations wherein said welding torch is reciprocated by a second cylinder and wherein a second stop is mounted on said second cylinder, said first and second stops interacting in such a manner that when said second stop contacts said first stop, said first stop limits the stroke of said welding torch.

2. The welding apparatus of claim 1 wherein the arbor includes channels on its surface, the channels running lengthwise along the surface of the arbor and the stacking members reciprocate in the channels.

3. The welding apparatus of claim 2 wherein the nest tool includes three stacking members.

4. The welding apparatus of claim 3 wherein one of the stacking members has a circular cross-section and two of the stacking members have angular cross-sections.

5. The apparatus of claim 4 wherein the welding apparatus further includes a water jacket assembly through which the arbor passes.

6. The welding apparatus of claim 5 wherein the water jacket assembly further includes a support member and a water jacket mounted on the support member, the water jacket being provided to cool the arbor as the laminations are being welded.

7. The apparatus of claim 1 wherein the apparatus includes two welding torches mounted for reciprocation on the apparatus.

8. The apparatus of claim 1 wherein the apparatus includes four welding torches mounted for reciprocation on the apparatus.

9. The apparatus of claim 1 wherein said arbor is moveable downwardly and said nest tool is moveable upwardly such that said arbor engages the base of said nest tool and adjusts the spacing between the first stop and the second stop.

10. The welding apparatus of claim 9 further including a strike off plate mounted on the water jacket to prevent the water jacket from becoming damaged while the laminations are being welded.

11. The welding apparatus of claim 10 wherein the water jacket assembly further includes a water jacket electrical isolator mounted between the water jacket and the support member to prevent the flow of electrical current from the water jacket to the frame while the laminations are being welded.

12. The welding apparatus of claim 11 wherein the nest tool further includes a strike off plate mounted on the base to prevent the nest tool from becoming damaged by the welding torches during a welding operation.

13. The welding apparatus of claim 12 wherein the arbor is reciprocated by a first servo motor and the welding torches are reciprocated by a second servo motor.

14. The apparatus of claim 10 wherein said nest tool is moveable upwardly such that said lamination stacking members contact said strike off plate.

15. A process for welding stator laminations comprising the steps of:

moving a stack of stator laminations into a welding apparatus, the laminations being stacked on a nest tool;

inserting an arbor into the stack of laminations, said arbor being reciprocated by a first cylinder with a first stop;

clamping the stack of laminations between the nest tool and the arbor;

welding the stack of laminations while the stack is clamped in a stationary position using welding torches mounted on a second cylinder having a second stop;

limiting the stroke of said welding torches by contacting said second stop with said first stop;

removing the arbor from the stack of laminations; and removing the stack of laminations from the welding apparatus.

16. The process according to claim 15 wherein the nest tool includes a base and a plurality of lamination stacking members extending therefrom, the arbor and the nest tool reciprocating with respect to each other such that a plurality of laminations can be stacked on the stacking members on the nest tool and the stack of laminations can be clamped between the arbor and the nest tool with the arbor extending down the center of the stack.

17. The process according to claim 16 wherein the arbor includes channels on its surface, the channels running lengthwise along the surface of the arbor and the stacking members reciprocate in the channels.

18. The process of claim 17 further including the step of cooling the arbor with a water jacket while the laminations are being welded.

19. The process according to claim 18 wherein the welding torches are moved a distance about equal to the height of the stack of laminations plus no more than approximately 4 mm.

20. A welding apparatus for welding a stack of stator laminations comprising:

an arbor;

a nest tool including a base and a plurality of laminations stacking members extending therefrom, the arbor and the nest tool reciprocating with respect to each other such that a plurality of laminations can be stacked on the stacking members on the nest tool and the stack of laminations can be clamped between the arbor and the nest tool with the arbor extending downwardly through the center of the stack of laminations, wherein the arbor includes channels on its surface, the channels running lengthwise along the surface of the arbor and wherein the stacking members reciprocate in the channels; and at least one welding torch mounted for reciprocation relative to the stack of laminations.

* * * * *